US011640774B2

(12) United States Patent
Kashiwagi et al.

(10) Patent No.: US 11,640,774 B2
(45) Date of Patent: May 2, 2023

(54) DISPLAY METHOD FOR DISPLAY SYSTEM, DISPLAY METHOD FOR DISPLAY APPARATUS, AND DISPLAY SYSTEM

(71) Applicant: SEIKO EPSON CORPORATION, Tokyo (JP)

(72) Inventors: Akihiro Kashiwagi, Azumino (JP); Makoto Shimazaki, Matsumoto (JP); Hirotaka Mochizuki, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/879,483

(22) Filed: Aug. 2, 2022

(65) Prior Publication Data

US 2023/0039541 A1    Feb. 9, 2023
US 2023/0039541 A1    Feb. 9, 2023

(30) Foreign Application Priority Data

Aug. 3, 2021   (JP) .............................. JP2021-127739

(51) Int. Cl.
    *G09G 3/00*       (2006.01)
    *G09G 3/20*       (2006.01)

(52) U.S. Cl.
    CPC ............... *G09G 3/002* (2013.01); *G09G 3/20* (2013.01); *G09G 2320/0233* (2013.01); *G09G 2320/0626* (2013.01); *G09G 2360/16* (2013.01)

(58) Field of Classification Search
    CPC .. G09G 3/002; G09G 3/20; G09G 2320/0233; G09G 2320/0626; G09G 2360/16
    See application file for complete search history.

(56) References Cited

U.S. PATENT DOCUMENTS

| 2017/0127028 | A1 | 5/2017 | Oike et al. |
| 2019/0124307 | A1 | 4/2019 | Oike |
| 2022/0014719 | A1* | 1/2022 | Ishida ...................... G09G 5/10 |
| 2022/0101800 | A1* | 3/2022 | Ai ........................ G09G 3/3258 |

FOREIGN PATENT DOCUMENTS

| JP | 2013-25076 A | 2/2013 |
| JP | 2015-145892 A | 8/2015 |
| JP | 2016-180921 A | 10/2016 |
| JP | 2017-83672 A | 5/2017 |
| JP | 2019-078786 A | 5/2019 |

* cited by examiner

*Primary Examiner* — Gene W Lee
(74) *Attorney, Agent, or Firm* — Oliff PLC

(57) ABSTRACT

A display method includes, determining a first target value by correcting a first luminance value representing luminance at a first position in a first image based on a second luminance value representing luminance at a second position in the first image, displaying, by the display apparatus, on the display surface a first corrected image generated by correcting the first image in such a way that a luminance at the first position in the first image becomes the first target value, displaying, by the display apparatus, on the display surface a third corrected image generated by using a changed first target value obtained by changing the first target value based on a second target value based on a fourth luminance value representing luminance at a fourth position in the second image, when the second target value is smaller than the first target value.

10 Claims, 9 Drawing Sheets

FIG. 5

| B11 66% | B12 | B13 80% | B14 | B15 66% |
|---|---|---|---|---|
| B21 | B22 80% | B23 | B24 80% | B25 |
| B31 72% | B32 | B33 100% | B34 | B35 72% |
| B41 | B42 80% | B43 | B44 80% | B45 |
| B51 66% | B52 | B53 80% | B54 | B55 66% |

DISPLAY METHOD FOR DISPLAY SYSTEM, DISPLAY METHOD FOR DISPLAY APPARATUS, AND DISPLAY SYSTEM

The present application is based on, and claims priority from JP Application Serial Number 2021-127739, filed Aug. 3, 2021, the disclosure of which is hereby incorporated by reference herein in its entirety.

BACKGROUND

1. Technical Field

The present disclosure relates to a display method for a display system, a display method for a display apparatus, and the display system.

2. Related Art

There has been a known technology for correcting luminance unevenness of an image displayed by a display apparatus on a display surface.

For example, JP-A-2016-180921 discloses a display system including an image processing apparatus that corrects luminance nonuniformity resulting from the luminance distribution of a screen and a projector that displays an image based on an image output signal corrected by the image processing apparatus.

When a plurality of display apparatuses display images, there is conceivably a case where luminance unevenness of the images needs to be corrected. The disclosure in JP-A-2016-180921 is, however, not intended to be applied to the case where a plurality of display apparatuses display images. An approach to correction of luminance unevenness of the displayed images is therefore desired.

SUMMARY

An aspect of the present disclosure relates to a display method for a display system, the method including determining a first target value by correcting a first luminance value representing luminance at a first position in a first image, which is displayed by a first display apparatus on a display surface, based on a second luminance value representing luminance at a second position in the first image, causing the first display apparatus to display on the display surface a first corrected image generated by correcting the first image in such a way that the luminance at the first position in the first image becomes the first target value, determining a second target value by correcting a third luminance value representing luminance at a third position in a second image, which is displayed by a second display apparatus on the display surface, based on a fourth luminance value representing luminance at a fourth position in the second image, causing the second display apparatus to display on the display surface a second corrected image generated by correcting the second image in such a way that the luminance at the third position in the second image becomes the second target value, changing the first target value based on the second target value when the first target value is greater than the second target value and causing the first display apparatus to display on the display surface a third corrected image generated by using the changed first target value, and changing the second target value based on the first target value when the second target value is greater than the first target value and causing the second display apparatus to display on the display surface a fourth corrected image generated by using the changed second target value.

Another aspect of the present disclosure relates to a display method for a display apparatus, the method including determining a first target value by correcting a first luminance value representing luminance at a first position in a first image, which is displayed by a display apparatus on a display surface, based on a second luminance value representing luminance at a second position in the first image, causing the display apparatus to display on the display surface a first corrected image generated by correcting the first image in such a way that a luminance at the first position in the first image becomes the first target value, and changing the first target value based on the second target value when the second target value, which is determined by correcting a third luminance value representing luminance at a third position in the second image, which is displayed by another display apparatus different from the display apparatus on the display surface, based on a fourth luminance value representing luminance at a fourth position in the second image, is smaller than the first target value and causing the display apparatus to display on the display surface a third corrected image generated by using the changed first target value.

Another aspect of the present disclosure relates to a display system including a first display apparatus that displays a first image on a display surface, a second display apparatus that displays a second image on the display surface, and a control apparatus that controls the first display apparatus and the second display apparatus, and the control apparatus determines a first target value by correcting a first luminance value representing luminance at a first position in the first image based on a second luminance value representing luminance at a second position in the first image, causes the first display apparatus to display on the display surface a first corrected image generated by correcting the first image in such a way that the luminance at the first position in the first image becomes the first target value, determines a second target value by correcting a third luminance value representing luminance at a third position in the second image based on a fourth luminance value representing luminance at a fourth position in the second image, causes the second display apparatus to display on the display surface a second corrected image generated by correcting the second image in such a way that the luminance at the third position in the second image becomes the second target value, changes the first target value based on the second target value when the first target value is greater than the second target value and causes the first display apparatus to display on the display surface a third corrected image generated by using the changed first target value, and changes the second target value based on the first target value when the second target value is greater than the first target value and causes the second display apparatus to display on the display surface a fourth corrected image generated by using the changed second target value.

Another aspect of the present disclosure relates to a display apparatus including a display section that displays a first image on a display surface; and a control section that controls the display section, and the control section determines a first target value by correcting a first luminance value representing luminance at a first position in the first image, which is displayed by the display apparatus on the display surface, based on a second luminance value representing luminance at a second position in the first image, causes the display apparatus to display on the display surface a first corrected image generated by correcting the first image in such a way that the luminance value at the first position in the first image becomes the first target value, and changes the first target value based on a second target value, which is determined by correcting a third luminance value representing luminance at a third position in a second image, which is displayed by another display apparatus different from the display apparatus on the display surface, based on a fourth luminance value representing luminance at a fourth position in the second image, when the second target value is smaller than the first target value and causes the display apparatus to display on the display surface a third corrected image generated by using the changed first target value.

BRIEF DESCRIPTION OF THE DRAWINGS

FIG. 5 shows an example in which luminance unevenness occurs in an overall image displayed by the projectors.

DESCRIPTION OF EXEMPLARY EMBODIMENTS

1. System Configuration

Figure 1:
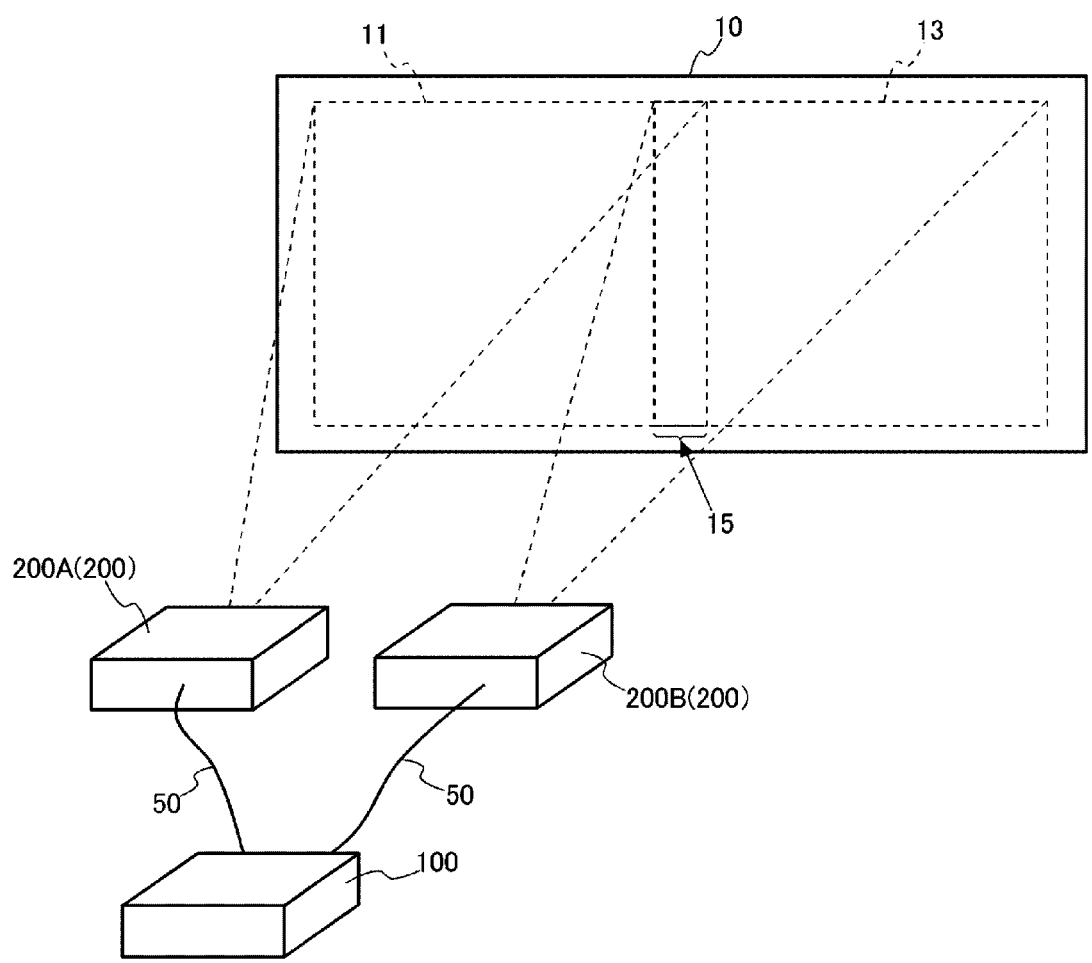
FIG. 1 shows an example of a system configuration of a display system.

FIG. 1 shows an example of a system configuration of a display system 1.

The display system 1 includes a control apparatus 100 and a plurality of projectors 200, which are connected to the control apparatus 100 via cables 50. The control apparatus 100 and the projector 200 communicate data to each other via the cables 50. The present embodiment will be described with reference to a case where the control apparatus 100 and the projectors 200 are wired to each other, and the control apparatus 100 and the projectors 200 may be wirelessly connected to each other.

The control apparatus 100 is, for example, a computer apparatus, such as a personal computer and a tablet computer. The control apparatus 100 is an apparatus that supplies the projectors 200 connected thereto with image data. The projectors 200 then display images based on the image data supplied from the control apparatus 100 on a projection surface 10. The image data with which the control apparatus 100 supplies the projectors 200 may be video data or still image data. The control apparatus 100 controls the plurality of projectors 200 to correct luminance unevenness of the images displayed by the projectors 200. The projection surface 10 corresponds to a display surface.

The display system 1 according to the present embodiment includes two projectors 200. In the following description, the two projectors 200 are called a first projector 200A and a second projector 200B. The first projector 200A corresponds to a first display apparatus, and the second projector 200B corresponds to a second display apparatus. In the following description, the first projector 200A and the second projector 200B are collectively referred to as projectors 200. The number of projectors 200 provided in the display system 1 is not limited to two and may be three or more.

The first projector 200A and the second projector 200B are arranged in a single row in the horizontal direction of the projection surface 10, as shown in FIG. 1. The first projector 200A and the second projector 200B are not necessarily arranged in a single horizontal row and may instead be arranged in a single vertical row. The plurality of projectors 200 may be arranged in a matrix formed of N rows and M columns. N and M are each a natural number greater than or equal to two.

The projection surface 10, on which the projectors 200 display images, is, for example, a screen and may instead, for example, be a curved or irregular surface, a wall surface of a building, or a flat surface of an installed object.

The display system 1 displays one large image by linking the images displayed by the first projector 200A and the second projector 200B to each other on the projection surface 10. The projection form described above is called tiling projection. The control apparatus 100 divides the image data into a plurality of divided image data portions and supplies the first projector 200A and the second projector 200B with the divided image data portions.

The first projector 200A projects image light onto a first projection area 11, which is a left area when viewed in the direction toward the projection surface 10. A first image is thus displayed in the first projection area 11. The second projector 200B projects image light onto a second projection area 13, which is a right area when viewed in the direction toward the projection surface 10. A second image is thus displayed in the second projection area 13.

Furthermore, when the display system 1 performs the tiling projection, the first projector 200A displays an image on the projection surface 10 in such a way that the image partially overlap with the second projection area 13, and the second projector 200B displays an image on the projection surface 10 in such a way that the image partially overlap with the first projection area 11. In the example shown in FIG. 1, a right portion of the first projection area 11 when viewed in the direction toward the projection surface 10 and a left portion of the second projection area 13 when viewed in the direction toward the projection surface 10 are superimposed on each other to form a superimposed area 15.

The image light projected by each of the two projectors, the image light from the first projector 200A and the image light from the second projector 200B are projected onto the superimposed area 15. The luminance in the superimposed area 15 is therefore higher than that in the area of the first projection area 11 other than the superimposed area 15. Furthermore, the luminance in the superimposed area 15 is higher than that in the area of the second projection area 13 other than the superimposed area 15. Therefore, the first projector 200A lowers the luminance of the image to be displayed in the superimposed area 15 to a value lower than the luminance of the image to be displayed in the area other than the superimposed area 15 to make the difference in luminance between the superimposed area 15 and the other area less noticeable. Similarly, the second projector 200B lowers the luminance of the image to be displayed in the superimposed area 15 to a value lower than the luminance of the image to be displayed in the area other than the superimposed area 15 to make the difference in luminance between the superimposed area 15 and the other area less noticeable. The display system 1 thus suppresses luminance unevenness of the entire image including the first and second images.

2. Configuration of Control Apparatus 100

Figure 2:
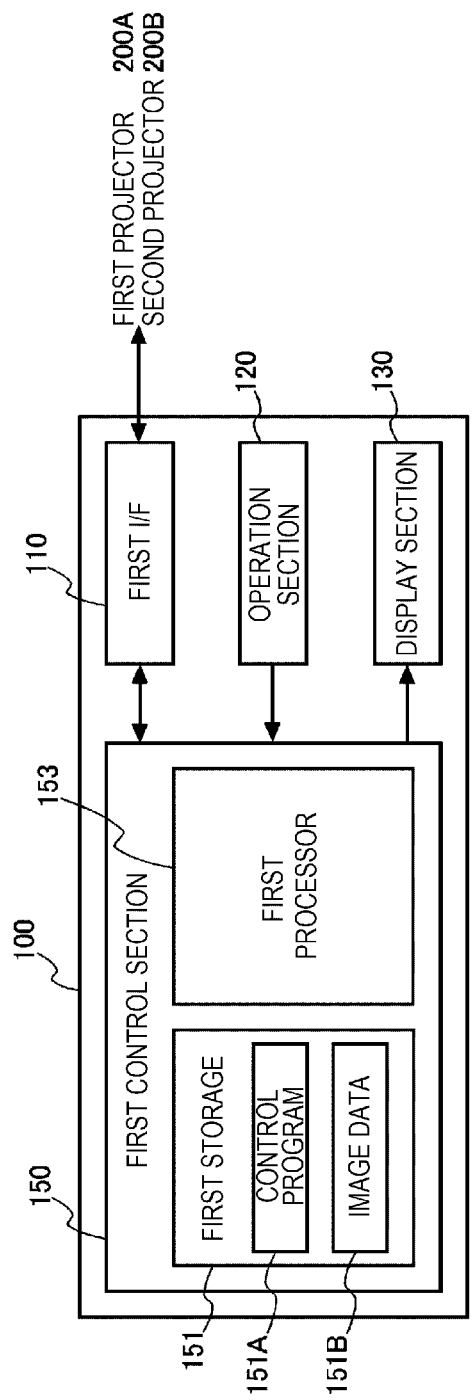
FIG. 2 shows an example of the configuration of a control apparatus.

FIG. 2 shows an example of the configuration of the control apparatus 100.

The configuration of the control apparatus 100 will be described with reference to FIG. 2.

The control apparatus 100 includes a first interface 110, an operation section 120, a display section 130, and a first control section 150. An interface is hereinafter also abbreviated to an I/F.

The first I/F 110 is a wired interface having terminals, such as a USB (universal serial bus) connector and an Ethernet connector, and an interface circuit. The first I/F 110 may instead be an interface for wireless communication. Ethernet is a registered trademark.

The operation section 120 includes an input device, for example, a keyboard and a mouse, and accepts a user's operation. The operation section 120 outputs an operation signal corresponding to the accepted operation to the first control section 150.

The display section 130 includes a display panel, such as a liquid crystal panel and an organic electroluminescence (EL) panel. The display section 130 displays a display screen generated by the first control section 150.

The first control section 150 is a computer apparatus including a first storage 151 and a first processor 153.

The first storage 151 includes a volatile memory, such as a RAM (random access memory), and a nonvolatile memory, such as a ROM (read only memory). The first storage 151 further includes an auxiliary storage device, such as an SSD (solid state drive) and an HDD (hard disk drive).

The first storage 151 stores a control program 151A to be executed by the first processor 153 and image data 151B to be supplied to the projectors 200. The control program 151A contains an application program that corrects luminance unevenness of the images displayed on the projection surface 10 by the first projector 200A and the second projector 200B. The image data 151B may be data received by the control apparatus 100 from an external source or may be data generated by the user through operation of the operation section 120.

The first processor 153 is an arithmetic operation device formed of a CPU (central processing unit) or an MPU (micro-processing unit). The first processor 153 executes the control program 151A to control each portion of the control apparatus 100.

The first control section 150 reads the image data from the first storage 151 and divides one frame of the read image data into two image data portions, left and right image data portions into which the image data is divided in the horizontal direction. Out of the two left and right image data portions, the first control section 150 transmits the left image data portion to the first projector 200A and the right image data portion to the second projector 200B.

When the application program is activated through operation of the control section 120, the first control section 150 executes the application program. The first control section 150 that executes the application program controls the first projector 200A to generate first correction values that correct the luminance unevenness of the image displayed by the first projector 200A. Similarly, the first control section 150 that executes the application program controls the second projector 200B to generate second correction values that correct the luminance unevenness of the image displayed by the second projector 200B. The first control section 150 uses the first correction values to correct the image displayed by the first projector 200A, so that the first control section 150 corrects the luminance at a first position in the image displayed by the first projector 200A from a first luminance value to a first target value. Similarly, the first control section 150 uses the second correction values to correct the image displayed by the second projector 200B, so that the first control section 150 corrects the luminance at a third position in the image displayed by the second projector 200B from a third luminance value to a second target value.

When there is differences in luminance between the image displayed by the first projector 200A and the image displayed by the second projector 200B, the first control section 150 generates third corrections value that correct the differences in luminance between the images. The process of generating the first, second, and third correction values will be described later in detail. The first, second, and third correction values are parameters used in the process of correcting luminance, and are in the present embodiment numerical values to be added to or subtracted from luminance values. The first, second, and third correction values may instead be parameters in an arithmetic operation of changing luminance values. The first, second, and third correction values may still instead be arithmetic expressions or matrices used to carry out the arithmetic operation of changing luminance values.

3. Configuration of Projectors 200

Figure 3:
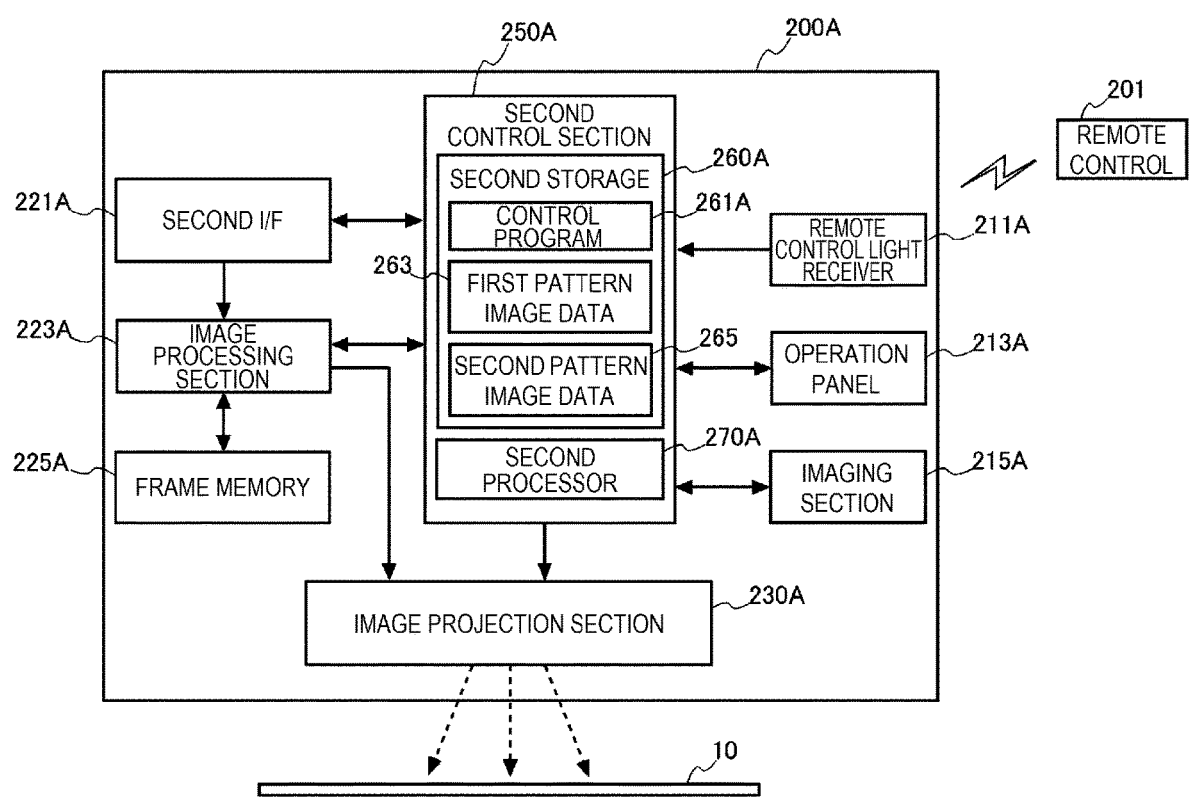
FIG. 3 shows an example of the configuration of a first projector.

FIG. 3 is a block diagram showing an example of the configuration of the first projector 200A.

The configuration of the first projector 200A will be described with reference to FIG. 3. The second projector 200B has substantially the same configuration as that of the first projector 200A. The configuration of the second projector 200B will not therefore be described in detail. In the following description, each component provided in the first projector 200A has a reference character followed by "A", and each component provided in the second projector 200B has a reference character followed by "B". For example, a second control section 250 provided in the first projector 200A is called a second control section 250A, and the second control section 250 provided in the second projector 200B is called a second control section 250B.

The first projector 200A includes a remote control light receiver 211A, an operation panel 213A, an imaging section 215A, a second I/F 221A, an image processing section 223A, a frame memory 225A, an image projection section 230A, and the second control section 250A.

The remote control light receiver 211A receives an infrared signal transmitted by a remote control 201. The remote control light receiver 211A outputs an operation signal corresponding to the received infrared signal to the second control section 250A. The operation signal is a signal corresponding to an operated switch of the remote control 201.

The operation panel 213A is mounted, for example, on an enclosure of the first projector 200A and includes, for example, a variety of switches, such as a power switch that powers on and off the first projector 200A. When any of the switches on the operation panel 213A is operated, an operation signal corresponding to the operated switch is outputted from the operation panel 213A to the second control section 250A.

The imaging section 215A includes an imaging lens, an imaging device, such as a CCD (charge coupled device) and a CMOS (complementary MOS) device, and a data processing circuit. An imaging optical system, the imaging device, and the data processing circuit are not shown. Under the control of the second control section 250A, the imaging section 215A captures an image in the projection direction in which the image projection section 230A projects the image light. The imaging range, that is, the angle of view of the imaging section 215A covers the projection surface 10 and regions therearound. The imaging section 215A outputs the captured image generated by the image capturing operation to the second control section 250A.

The second I/F 221A is a wired interface having terminals, such as a USB connector and an Ethernet connector, and an interface circuit. The second I/F 221A may instead be an interface for wireless communication.

The frame memory 225A is coupled to the image processing section 223A. The frame memory 225A includes a plurality of banks. The banks each have storage capacity that allows image data corresponding to one frame to be written to the bank. The frame memory 225A is formed, for example, of an SDRAM (synchronous dynamic random access memory). The image processing section 223A develops image data inputted via the second I/F 221A in the frame memory 225A.

The image processing section 223A performs image processing on the image data developed in the frame memory 225A. The image processing performed by the image processing section 223A includes, for example, resolution conversion or resizing, distortion correction, shape correction, digital zooming, and adjustment of image hue and brightness. The image processing section 223A carries out a process specified by the second control section 250A and uses, as required, parameters inputted from the second control section 250A. The image processing section 223A can, of course, perform a plurality of types of the image processing described above in combination. The image processing section 223A reads the image data developed in the bank selected by the second control section 250A from the frame memory 225A and outputs the read image data to image projection section 230A.

The image processing section 223A and the frame memory 225A are, for example, formed of integrated circuits. The integrated circuits include an LSI, an ASIC (application specific integrated circuit), a PLD (programmable logic device), an FPGA (field-programmable gate array), an SoC (system-on-a-chip), and other devices. An analog circuit may form part of the configurations of the integrated circuits, or the second control section 250A and the integrated circuits may be combined with each other.

Figure 4:
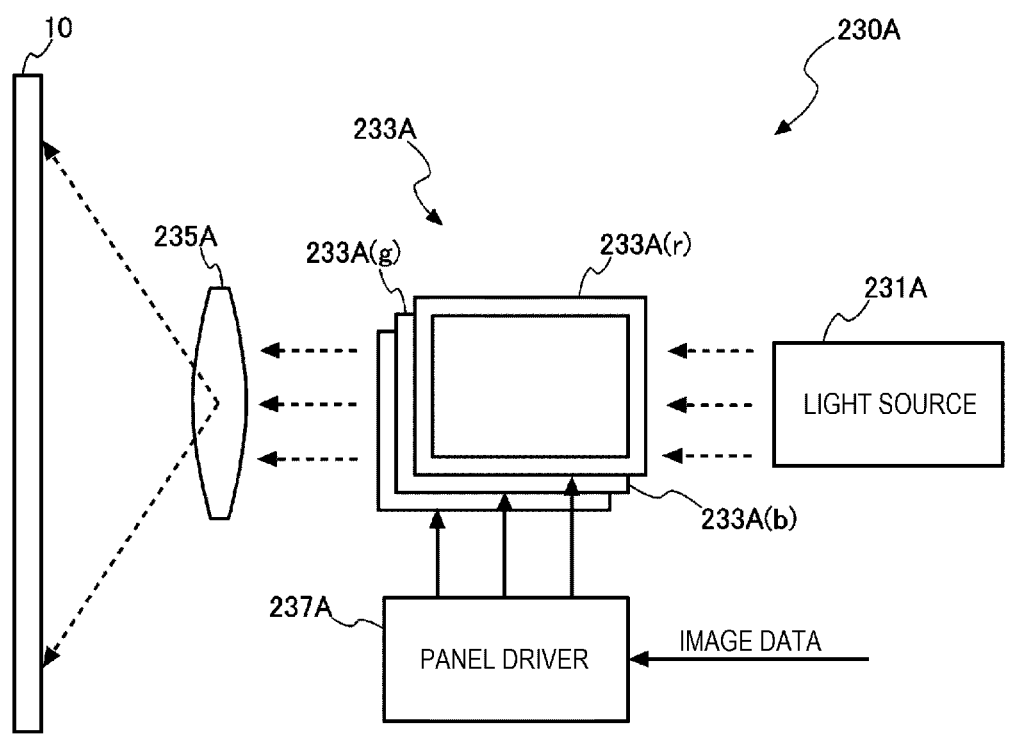
FIG. 4 shows an example of the configuration of an image projection section.

FIG. 4 shows an example of the configuration of the image projection section 230A.

The configuration of the image projection section 230A will now be described with reference to FIG. 4.

The image projection section 230A modulates the light outputted from a light source 231A to generate image light, and an optical unit 235A enlarges the generated image light and projects the enlarged image light. The image projection section 230A includes the light source 231A, three liquid crystal panels 233A(r), 233A(g), and 233A(b) as light modulators, the optical unit 235A, and a panel driver 237A. The liquid crystal panels 233A(r), 233A(g), and 233A(b) provided in the first projector 200A are hereinafter collectively referred to as liquid crystal panels 233A. The image projection section 230A and the components provided therein, the light source 231A, the liquid crystal panels 233A, the optical unit 235A, and the panel driver 237A, are an example of a display section.

The light source 231A includes a discharge-type light source lamp, such as an ultrahigh-pressure mercury lamp and a metal halide lamp, or a solid-state light source, such as a light emitting diode and a semiconductor laser. The light outputted from the light source 231A enters the liquid crystal panels 233A. The liquid crystal panels 233A(r), 233A(g), and 233A(b) are each formed, for example, of a transmissive liquid crystal panel including a liquid crystal material encapsulated between a pair of transparent substrates. The liquid crystal panel 233A(r) modulates red light, the liquid crystal panel 233A(g) modulates green light, and the liquid crystal panel 233A(b) modulates blue light. The liquid crystal panels each have a pixel area formed of a plurality of pixels arranged in a matrix, and a drive voltage is applicable to the liquid crystal material on a pixel basis.

The image data outputted by the image processing section 223A is inputted to the panel driver 237A. The panel driver 237A applies a drive voltage according to the inputted image data to each of the pixels in the pixel areas to set the pixel to have optical transmittance according to the image data. The light outputted from the light source 231A passes through pixel areas of the liquid crystal panels 233A(r), 233A(g), and 233A(b) and is therefore modulated on a pixel basis to form image light corresponding to the image data on a color basis. The thus formed red image light, green image light, and blue image light are combined with one another on a pixel basis by a light combining system that is not shown into image light representing a color image. The optical unit 235A includes a projection lens and other components, enlarges the image light modulated by liquid crystal panels 233A(r), 233A(g) and 233A(b), and projects the enlarged image light onto the first projection area 11 of projection surface 10.

Referring back to FIG. 3, the configuration of the second control section 250A will be described.

The second control section 250A is a computer apparatus including a second storage 260A and a second processor 270A.

The second storage 260A includes a volatile memory such as a RAM, and a nonvolatile memory, such as a ROM and a flash memory. The second storage 260A stores, for example, a control program 261A to be executed by the second processor 270A, and first pattern image data 263 and second pattern image data 265, which are used in the process of correcting luminance unevenness. In the present embodiment, solid white image data is used as the first pattern image data 263, and solid black image data is used as the second pattern image data 265.

The second processor 270A is an arithmetic operation device formed of a CPU or an MPU. The second processor 270A executes the control program 261A to control each portion of the first projector 200A. The second processor 270A may be formed of a single processor or a plurality of processors. The second processor 270A may be formed of an SoC integrated with part or entirety of the second storage 260A and other circuits. The second processor 270A may instead be formed of a combination of a CPU that executes a program and a DSP (digital signal processor) that performs predetermined arithmetic processing. Further, the entire functions of the second processor 270a may be implemented in hardware or may be implemented by using a programmable device.

The second control section 250A controls the image processing section 223A and the image projection section 230A in accordance with instructions received from the control apparatus 100 to display an image on the projection surface 10. The second control section 250A causes the imaging section 215A to capture an image of the projection surface 10 in accordance with an instruction received from the control apparatus 100, and transmits the captured image generated by the image capturing operation to the control apparatus 100.

4. Correction of Luminance Unevenness

The first control section 150 controls the first projector 200A and the second projector 200B to generate the first correction values that correct the luminance unevenness of the image displayed by the first projector 200A, as described above. The first control section 150 further controls the first projector 200A and the second projector 200B to generate the second correction values that correct the luminance unevenness of the image displayed by the second projector 200B.

In general, it is known that luminance unevenness occurs in the images displayed by the projectors 200 on the projection surface 10. The luminance unevenness is caused, for example, by the characteristics of the screen, and the structures of the projection lens and the projectors 200. In many cases, it is known that the luminance unevenness occurs in such a way that the luminance is higher at a position closer to the center of the projection surface 10, and the luminance is lower at a position closer to the periphery of the projection surface 10.

FIG. 5 shows an example in which the luminance unevenness occurs in the overall image displayed by the projectors 200.

FIG. 5 shows 25 blocks into which the overall image displayed by the projectors 200 is divided, five vertical blocks and five horizontal blocks. The blocks each contain a preset number of pixels. FIG. 5 also shows the luminance of representative blocks. The luminance is the average of the luminance values of the pixels contained in each of the representative blocks, the luminance expressed in the form of percentage, that is, the ratio of the luminance of the block of interest to the luminance of a block B33 located at the center of the image and expressed as 100%.

In the example shown in FIG. 5, the luminance of blocks B11 and B51, which are located at the upper left end and the lower left end viewed in the direction toward the image, and the luminance of blocks B15 and B55, which are located at the upper right end and the lower right end viewed in the direction toward the image, are 66% with respect to the luminance of the block B33, which is located at the center of the image.

The luminance of blocks B13 and B53, which are located at the center of the image in the horizontal direction and at the upper end and the lower end in the vertical direction, is 80% with respect to the luminance of the block B33, which is located at the center of the image.

The luminance of blocks B31 and B35, which are located at the center of the image in the vertical direction and at the left end and the right end in the horizontal direction, is 72% with respect to the luminance of the block B33, which is located at the center of the image.

The luminance of a block B22, which is located in the second row counted from above in the vertical direction and in the second column counted from left in the horizontal direction when viewed in the direction toward the image, and the luminance of a block B24, which is located in the second row counted from above in the vertical direction and in the fourth column counted from left in the horizontal direction when viewed in the direction toward the image, are 80% with respect to the luminance of the block B33, which is located at the center of the image.

The luminance of a block B42, which is located in the fourth row counted from above in the vertical direction and in the second column counted from left in the horizontal direction when viewed in the direction toward the image, and the luminance of a block B44, which is located in the fourth row counted from above in the vertical direction and in the fourth column counted from left in the horizontal direction when viewed in the direction toward the image, are 80% with respect to the luminance of the block B33, which is located at the center of the image.

As described above, in the example shown in FIG. 5, a block closer to the center of the image has higher luminance, and a block farther from the center toward the periphery has lower luminance, resulting in a difference in luminance depending on the position in the projected image.

The first control section 150 carries out the following processes to reduce the difference in luminance depending on the position in the image projected by the first projector 200A.

The first control section 150 first identifies the range of the first projection area 11 in the captured image captured by the imaging section 215A. For example, the first control section 150 causes the first projector 200A to project a second pattern image that is an image based on the second pattern image data 265, and causes the imaging section 215A to capture an image of the projection surface 10. The second pattern image is a solid black image. The first control section 150 receives the captured image from the first projector 200A and identifies the range of the second pattern image displayed in the received captured image to identify the range of the first projection area 11 in the captured image. The first control section 150 generates first range information representing the identified range of the first projection area 11 in the captured image.

The first control section 150 then causes the first projector 200A to display a first pattern image that is an image based on the first pattern image data 263. The first pattern image is a solid white image. The first control section 150 further causes the second projector 200B to display the second pattern image based on the second pattern image data 265. The present embodiment will be described with reference to the case where the second projector 200B displays the solid black image based on the second pattern image data 265, and may instead be described with reference to a case where the light from a light source 231B provided in the second projector 200B is not allowed to leak out of the second projector 200B. For example, the light source 231B may be turned off or a shutter associated with the projection lens may be closed so that the light from the light source 231B does not leak out of the second projector 200B.

The first control section 150 then instructs the first projector 200A to capture an image and receives the captured image captured by the imaging section 215A from the first projector 200A. Having received the captured image from the first projector 200A, the first control section 150 uses the first range information to identify the range of the first projection area 11 in the received captured image.

The first control section 150 then determines the first position and a second position and calculates the first correction value that corrects the luminance at the first position from the first luminance value to the first target value.

The first position is the position of a pixel or a block in the first projection area 11, the pixel or the block being subject to the luminance value correction. The second position is the position of a pixel or a block in the first projection area 11, the pixel or the block serving as a luminance value reference when the luminance value at the first position is corrected.

For example, the second position is a position that satisfies the conditions below.

In a two-dimensional coordinate system so set that the origin is located at the upper left corner of the first projection area 11 and axes X and Y extend in the horizontal and vertical directions respectively, the coordinate X of the second position is an integer ax, which satisfies the condition expressed by Expression (1) or (2) below, $$0 \leq ax \leq 0.1 X \text{ max} \quad (1)$$

$$0.9 X \text{ max} \leq ax \leq X \text{ max} \quad (2)$$

where Xmax represents the maximum coordinate of the first projection area 11 in the axis-X direction, and Ymax represents the maximum coordinate of the first projection area 11 in the axis-Y direction.

The second position may instead be a position that satisfies the conditions below.

The coordinate system is so set that the origin is located at the upper left corner of the first projection area 11 and the axes X and Y extend in the horizontal and vertical directions, respectively, as described above. Under the definition that Xmax represents the maximum coordinate of the first projection area 11 in the axis-X direction, and Ymax represents the maximum coordinate of the first projection area 11 in the axis-Y direction, the coordinate Y of the second position is an integer by, which satisfies the condition expressed by Expression (3) or (4) below.

$$0 \leq by \leq 0.1 Y \text{ max} \quad (3)$$

$$0.9 Y \text{ max} \leq by \leq Y \text{ max} \quad (4)$$

The first and second positions may instead be positions that satisfy the condition below.

Assuming that (cx, dy) are the coordinates X and Y of the first position and (ax, by) are the coordinates X and Y of the second position, the coordinates (ax, by) and the coordinates (cx, dy) satisfy the relationship expressed by Expression (5) below. Note that cx is the coordinate X of the first position, and that dy is the coordinate Y of the first position.

$$\left| cx - \frac{X\max}{2} \right| \leq \left| ax - \frac{X\max}{2} \right| \text{ and } \left| dy - \frac{Y\max}{2} \right| \leq \left| by - \frac{Y\max}{2} \right| \quad (5)$$

That is, the second position in the first projection area 11, i.e., the image displayed by the first projector 200A is located outward from the first position.

The second position may still instead be a position that satisfies the conditions below.

The coordinates X and Y of the second position (ax, by) are (0, 0), (0, Ymax), (Xmax, 0), or (Xmax, Ymax).

The first position may still instead be a position that satisfies the condition below.

The first position is the pixel located at the center of the first projection area 11, that is, the center of the image projected by the first projector 200A, which means that the coordinates of the first position (cx, dy) are cx=Xmax/2 and dy=Ymax/2. That is, the first position is located substantially at the center of the image.

The following description, provided that the entire horizontal width of the first projection area 11 is considered to be 100%, will be made on the assumption that the second position is the position of the pixel shifted rightward by 10% of the entire horizontal width from the left end of the first projection area 11 or leftward by 10% of the entire horizontal width from the right end of the first projection area 11. The second position is located outward from the first position in the image. That is, the description will be made on the assumption that the first position is located inward from the second position in the image.

The first and second positions may each be set as the position of a pixel of the image or a block containing a plurality of pixels. In particular, the second position may be a block containing a pixel shifted leftward by 10% of the entire horizontal width from the right end of the first projection area 11, or a block containing a pixel shifted leftward by 10% of the entire horizontal width from the right end of the first projection area 11. In this case, whether or not the first position is located inward from the second position in the image can be evaluated based, for example, on the length of the straight line that connects the center of the image to the center of the block. For example, it is assumed in FIG. 5 that the block containing the second position is the block B22. In this case, the distance between the center of the block B33 located at the center of the image and the center of the block B22 is longer than the distance between the center of the block B33 located at the center of the image and the center of a block B23. Therefore, when the block containing the second position is the block B22, the block B23 can be determined as a block located inward from the block B22 containing the second position, so that any of the pixels contained in the block B23 can be set as a pixel located at the first position, or the block B23 may be set as a block containing the first position.

Once the first and second positions are determined, the first control section 150 determines the first target value by correcting the first luminance value, which represents the luminance at the first position, based on a second luminance value representing the luminance at the second position.

The first control section 150 calculates the first correction value that corrects the luminance at the first position in the image displayed by the first projector 200A from the first luminance value to the first target value. In the present embodiment, the first control section 150 determines the second luminance value at the second position as the first target value and calculates the first correction value that corrects the first luminance value at the first position to the second luminance value at the second position. That is, the first control section 150 sets the value as a result of subtraction of the first luminance value at the first position from the second luminance value at the second position as the first correction value.

It is noted that the first target value may not be equal to the second luminance value. For example, the first target value only needs to be closer to the second luminance value than the first luminance value. For example, let (r1, g1, b1) be the RGB values of the first luminance value, (r2, g2, b2) be the RGB values of the second luminance value, and (r3, g3, b3) be the RGB values of the first target value, and the RGB values of the first target value may be so determined that the integers r3, g3, b3 satisfy all conditions expressed by Expressions (6), (7), and (8) below.

$$r2 \leq r3 < r1 \quad (6)$$

$$g2 \leq g3 < g1 \quad (7)$$

$$b2 \leq b3 < b1 \quad (8)$$

The first correction value may, for example, be the value as a result of subtraction of the RGB values of the first luminance value (r1, g1, b1) from the RGB values of the first target value (r3, g3, b3). Since the luminance at the first position in the image displayed by the first projector 200A is corrected by the first correction value to the first target value, which is closer to the second luminance value than the first luminance value, the luminance at the first position becomes closer to the luminance at the second position, whereby the effect of luminance unevenness of the image displayed by the first projector 200A can be reduced.

When the first and second positions are each set as the position of a pixel of the image, the first control section 150 calculates the first correction value for each of the pixels of the image. When the first and second positions are each set as the position of a block containing a plurality of pixels, the first control section 150 calculates the first correction value for each of the blocks. When the first and second positions are each set as the position of a block containing a plurality of pixels, the first luminance value may be the average of the luminance values of the plurality of pixels contained in the block set as the block located at the first position. Similarly, the second luminance value may be the average of the luminance values of the plurality of pixels contained in the block set as the block located at the second position. The first control section 150 transmits the calculated first correction values to the first projector 200A.

Having received the first correction values from the control apparatus 100, the second control section 250A of the first projector 200A outputs the received first correction values to the image processing section 223A. The image processing section 223A corrects the luminance values of the image data by using the inputted first correction values, and outputs the corrected image data to the image projection section 230A. A first corrected image that is an image in which the luminance values of the image data have been corrected by the first correction values is thus displayed in the first projection area 11 of the projection surface 10.

As for the second image projected by the second projector 200B, the first control section 150 similarly determines the second target value by correcting the third luminance value representing the luminance at the third position based on a fourth luminance value representing the luminance at a fourth position in the image.

The third position is a position located inward from the fourth position in the image displayed by the second projector 200B, and is the position of a pixel or a block in the second image, the pixel or the block being subject to the luminance value correction, as the first position in the image displayed by the first projector 200A is. The fourth position is a position located outward from the third position in the image displayed by the second projector 200B, and is the position of a pixel or a block in the second image, the pixel or the block serving as the luminance value reference when the luminance value at the third position is corrected, as the second position in the image displayed by the first projector 200A is.

In the present embodiment, the first control section 150 determines the second target value by using the fourth luminance value at the fourth position. The first control section 150 determines the fourth luminance value at the fourth position as the second target value and calculates the second correction value that corrects the third luminance value at the third position to the fourth luminance value at the fourth position. That is, the first control section 150 sets the value as a result of subtraction of the third luminance value at the third position from the fourth luminance value at the fourth position as the second correction value.

It is noted that the second target value may not be equal to the fourth luminance value, as the first target value is not. The second target value only needs to be closer to the fourth luminance value than the third luminance value. The second correction value may be a correction value that corrects the third luminance value at the third position to the second target value. For example, the value as a result of subtraction of the third luminance value from the second target value may be set as the second correction value. The first control section 150 calculates the second correction value for each of the pixels or blocks of the image displayed by the second projector 200B. The first control section 150 transmits the calculated second correction values to the second projector 200B.

Having received the second correction values from the control apparatus 100, the second control section 250B of the second projector 200B outputs the received second correction values to the image processing section 223B. The image processing section 223B corrects the luminance values of the image data by using the inputted second correction values, and outputs the corrected image data to the image projection section 230B. A second corrected image that is an image in which the luminance values of the image data have been corrected by the second correction values is thus displayed in the second projection area 13 of the projection surface 10.

The first control section 150 then generates the third correction values. The third correction values are correction values that correct the differences in luminance between the image displayed by the first projector 200A and the image displayed by the second projector 200B.

The first control section 150 changes the first target value based on the second target value when the first target value is greater than the second target value, that is, when the second luminance value is greater than the fourth luminance value. The first control section 150 then generates the third correction value that corrects the luminance at the first position in the image displayed by the first projector 200A to the changed first target value. That is, the first control section 150 generates the third correction values that correct the second luminance value in the first image to the fourth luminance value in the second image.

The first control section 150 changes the second target value based on the first target value when the second target value is greater than the first target value, that is, when the fourth luminance value is greater than the second luminance value. The first control section 150 then generates the third correction value that corrects the luminance at the third position in the image displayed by the second projector 200B to the changed second target value. That is, the first control section 150 generates the third correction values that correct the fourth luminance value in the second image to the second luminance value in the first image.

When the first target value is greater than the second target value, the first control section 150 transmits the third correction values to the first projector 200A. When the second target value is greater than the first target value, the first control section 150 transmits the third correction values to the second projector 200B.

Having received the third correction values from the control apparatus 100, the second control section 250A outputs the received third correction values to the image processing section 223A. The image processing section 223A corrects the luminance values of the image data by using the inputted third correction value, and outputs the image data having the corrected luminance values to the image projection section 230A. A third corrected image that is an image in which the luminance values of the image data have been corrected by the third correction values is thus displayed in the first projection area 11 of the projection surface 10.

Having received the third correction values from the control apparatus 100, the second control section 250B outputs the received third correction values to the image processing section 223B. The image processing section 223B corrects the luminance values of the image data by using the inputted third correction values, and outputs the image data having the corrected luminance values to the image projection section 230B. A fourth corrected image that is an image in which the luminance values of the image data have been corrected by the third correction values is then displayed in the second projection area 13 of the projection surface 10.

The first control section 150 then accepts settings of a blended area for the tiling projection and sets luminance by which the luminance in the set blended area is lowered.

The blended area is the area where the first projectors 200A and second projector 200B lower the luminance of the images, and the blended area may coincide with the superimposed area 15 or may be broader than the superimposed area 15.

The first control section 150 accepts operations that set the blended area. For example, the first control section 150 causes the display section 130 to display figures corresponding to the first projection area 11 and the second projection area 13 on the projection surface 10 and accepts operations that set the blended area. Based on the accepted operations, the first control section 150 generates first setting information representing the ratio, expressed in percentage, of the blended area extending from the right end of the first projection area 11 to halfway therein to the entire first projection area 11 and second setting information representing the ratio, expressed in percentage, of the blended area extending from the left end of the second projection area 13 to halfway therein to the entire second projection area 13.

The first control section 150 then transmits control data instructing the first projector 200A and the second projector 200B to display the first pattern image. The first control section 150 then transmits the first setting information and the second setting information received by the operation section 120 to the first projector 200A and the second projector 200B, respectively.

The first control section 150 then transmits to the first projector 200A control data instructing the first projector 200A to lower by a preset setting value the luminance values in the blended area set by the first setting information. Similarly the first control section 150 transmits to the second projector 200B control data instructing the second projector 200B to lower by a preset setting value the luminance values in the blended area set by the second setting information. The setting value by which the luminance values in the blended area is lowered may be set in advance by the user via the operation section 120, or by using an initial value held by the application program executed by the first control section 150.

The first control section 150 transmits control data instructing the first projector 200A to capture an image of the projection surface 10. When receiving the captured image from the first projector 200A, the first control section 150 analyzes the captured image to determine the luminance values in the blended area and the non-blended area. For example, the first control section 150 determines the luminance values in a preset central area of the first projection area 11 and a preset central area of the blended area. The first control section 150 then determines the difference between the calculated luminance values and evaluates whether or not the determined difference in the luminance value is smaller than or equal to a predetermined value.

When the calculated difference in luminance is not smaller than or equal to the predetermined value, the first control section 150 transmits to the first projector 200A and the second projector 200B control data instructing the two projectors to further lower the luminance values in the blended area by the preset setting value. When the calculated difference in the luminance value is smaller than or equal to the predetermined value, the first control section 150 terminates the process procedure and starts supplying the first projector 200A and the second projector 200B with image data to be projected on the projection surface 10.

5. Action of Display System

Figure 6:
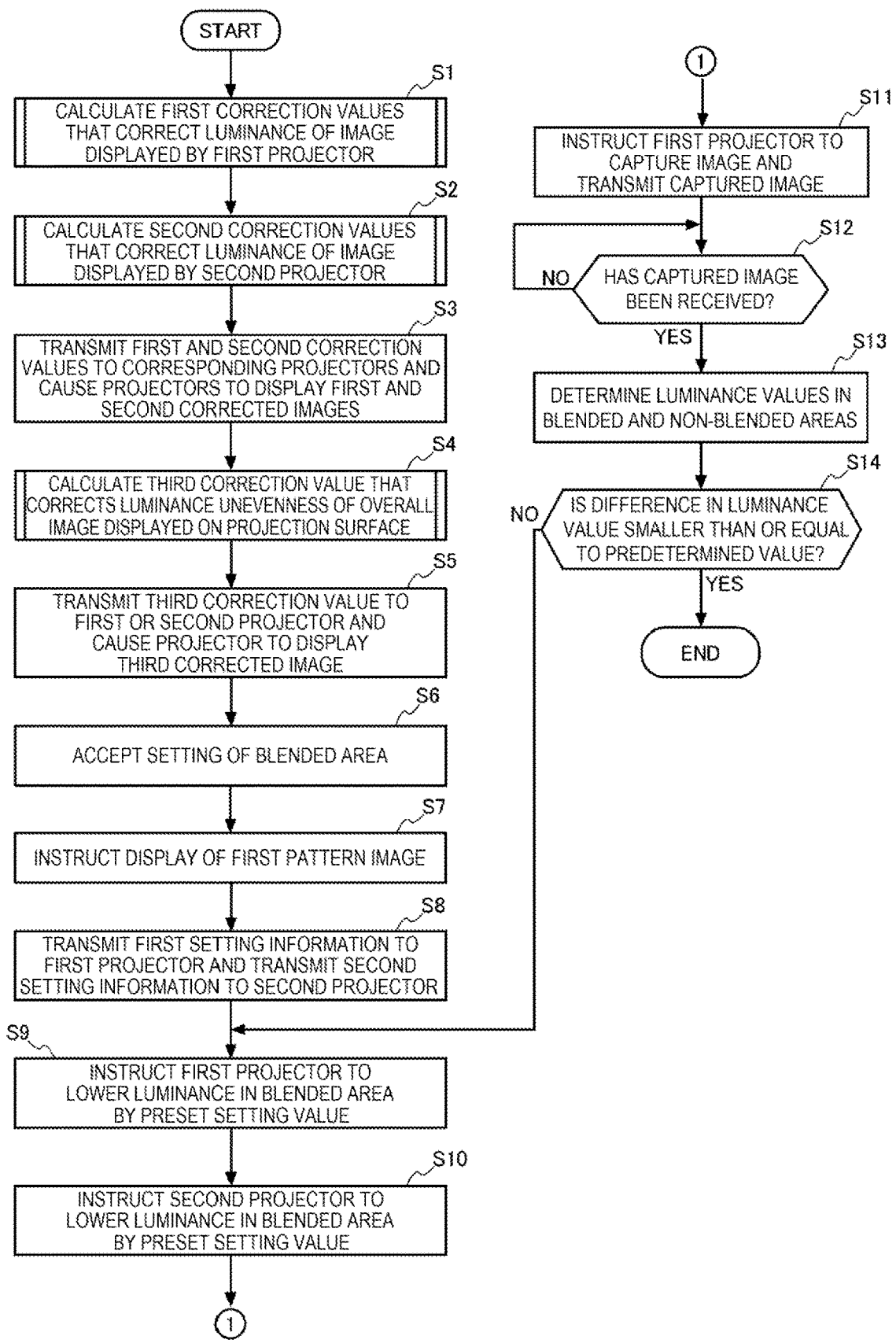
FIG. 6 is a flowchart showing the action of the display system.

FIG. 6 is a flowchart showing the action of the display system 1.

The action of the display system 1, primarily the action of the control apparatus 100, will be described with reference to the flowchart shown in FIG. 6. The process procedure is carried out, for example, after the control apparatus 100 is coupled to the first projectors 200A and 200B and when the application program is activated.

The first control section 150 first controls the first projector 200A to calculate the first correction values that correct the luminance of the image displayed by the first projector 200A (step S1).

The first control section 150 then controls the second projector 200B to calculate the second correction values that correct the luminance of the image displayed by the second projector 200B (step S2). The processes in steps S1 and S2 will be described later in detail with reference to the flowchart of FIG. 7.

The first control section 150 then transmits the first correction values calculated in step S1 to the first projector 200A, and causes the first projector 200A to display the first corrected image on the projection surface 10. The first control section 150 transmits the second correction values calculated in step S2 to the second projector 200B, and causes the second projector 200B to display the second corrected image on the projection surface 10 (step S3).

The first control section 150 then calculates the third correction values that correct the luminance unevenness of the overall image displayed on the projection surface 10 by the first projector 200A and the second projector 200B (step S4). The process described above will be described in detail with reference to the flowchart shown in FIG. 8. The first control section 150 transmits the generated third correction values to the first projector 200A or the second projector 200B, both of which are subject to the correction of luminance unevenness of the overall image. Furthermore, the first control section 150 causes the first projector 200A or second projector 200B to which the third correction values have been transmitted to display the third corrected image on the projection surface 10 (step S5).

The first control section 150 then accepts operations that set the blended area (step S6). For example, the first control section 150 causes the display section 130 to display figures corresponding to the first projection area 11 and the second projection area 13 on the projection surface 10 and accepts operations that set the blended area on the figures. The setting operation described above contains the first setting information representing the ratio, expressed in percentage, of the blended area extending from the right end of the first projection area 11 to halfway therein to the overall first projection area 11 and the second setting information representing the ratio, expressed in percentage, of the blended area extending from the left end of the second projection area 13 to halfway therein to the overall second projection area 13.

The first control section 150 then transmits the control data instructing the first projector 200A and the second projector 200B to display the first pattern image (step S7). The first control section 150 then transmits the first setting information and the second setting information received via the operation section 120 to the first projector 200A and the second projector 200B, respectively (step S8).

The first control section 150 then transmits to the first projector 200A the control data instructing the first projector 200A to lower by a preset setting value the luminance in the blended area set by the first setting information (step S9). Similarly, the first control section 150 transmits to the second projector 200B the control data instructing the second projector 200B to lower by a preset setting value the luminance in the blended area set by the second setting information (step S10).

The first control section 150 then transmits the control data instructing the first projector 200A to capture an image of the projection surface 10 (step S11). Having instructed capture of an image of the projection surface 10, the first control section 150 evaluates whether or not the first control section 150 has received the captured image captured by the first projector 200A (step S12). Having received no captured image (NO in step S12), the first control section 150 waits for reception of the captured image.

Having received the captured image (YES in step S12), the first control section 150 analyzes the captured image to determine the luminance values in the blended area and the non-blended area (step S13). For example, the first control section 150 determines the luminance in a preset central area of the first projection area 11 and a preset central area of the blended area. The first control section 150 then determines the difference in the calculated luminance value between the two areas and evaluates whether or not the determined difference in the luminance is smaller than or equal to a predetermined value (step S14).

When the calculated difference in the luminance is not smaller than or equal to the predetermined value (NO in step S14), the first control section 150 returns to the process in step S9. The first control section 150 transmits to the first projector 200A and the second projector 200B the control data instructing the two projectors to further lower the luminance in the blended area by the preset setting value.

When the calculated difference in the luminance is smaller than or equal to the predetermined value (YES in step S14), the first control section 150 terminates the process procedure and starts supplying the first projector 200A and the second projector 200B image data to be projected on the projection surface 10.

Figure 7:
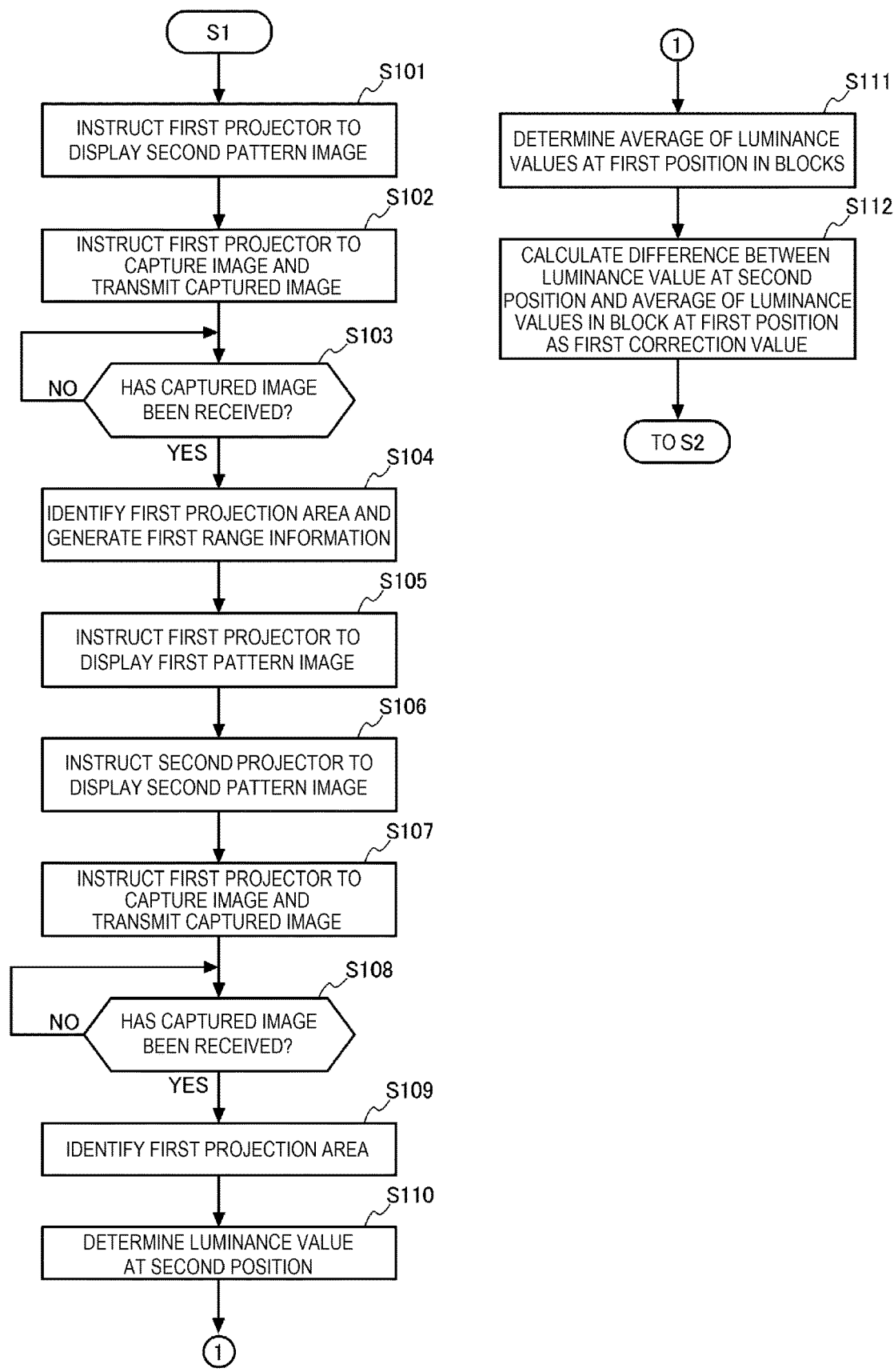
FIG. 7 is a flowchart showing the action of the display system.

FIG. 7 is a flowchart showing the action of the display system 1 and shows step S1 in detail.

Step S1 will be described in detail with reference to FIG. 7.

The first control section 150 first transmits control data instructing the first projector 200A to display the second pattern image (step S101). The first control section 150 then transmits to the first projector 200A control data instructing the first projector 200A to capture an image of the projection surface 10 and transmit the captured images generated by the image capturing operation (step S102). The first control section 150 then evaluates whether or not the first control section 150 has received the captured image from the first projector 200A (step S103). Having received no captured image (NO in step S103), the first control section 150 waits for reception of the captured image.

When receiving the captured image from the first projector 200A (YES in step S103), the first control section 150 analyzes the received captured image to detect the area where an image of the second pattern image has been captured and identifies the first projection area 11 of the captured image (step S104). The first control section 150 generates the first range information representing the range of the first projection area 11 of the captured image (step S104).

The first control section 150 then transmits the control data instructing the first projector 200A to display the first pattern image (step S105) and the control data instructing the second projector 200B to display the second pattern image (step S106).

The first control section 150 then transmits to the first projector 200A the control data instructing the first projector 200A to capture an image of the projection surface 10 and transmit the captured images generated by the image capturing operation (step S107). The first control section 150 then evaluates whether or not the first control section 150 has received the captured image from the first projector 200A (step S108). Having received no captured image (NO in step S108), the first control section 150 waits for reception of the captured image.

Having received the captured image (YES in step S108), the first control section 150 identifies the first projection area 11 of the received captured image based on the first range information generated in step S104 (step S109).

The first control section 150 then determines the luminance at the second position set in advance in the identified first projection area 11 (step S110). For example, provided that the entire horizontal width of the first projection area 11 of the captured image is considered to be 100%, the first control section 150 uses the position shifted leftward by 10% of the entire horizontal width from the right end of the first projection area 11 as the horizontal coordinate of the second position. Provided that the entire vertical width of the first projection area 11 is considered to be 100%, the first control section 150 uses the position separate by 50% of the entire vertical width from the upper end of the first projection area 11, in other words at the center of the first projection area 11, as the vertical coordinate of the second position.

The first control section 150 then calculates the average of the luminance values in the block at the first position out of the blocks into which the captured image is so divided that the blocks each contain a predetermined number of pixels (step S111). The first control section 150 then determines the first target value based on the second luminance value representing the luminance at the second position calculated in step S110 and the first luminance value representing the average of the luminance values in the block at the first position. In the present embodiment, the second luminance value representing the luminance at the second position is determined as the first target value.

The first control section 150 then determines the difference between the luminance at the second position determined as the first target value and the average of the luminance values in the block at the first position. As for each of the other blocks, the first control section 150 similarly determines the difference between the luminance at the second position determined as the first target value and the average of the luminance values in the block. The first control section 150 calculates the difference in luminance calculated on a block basis as the first correction value in the block (step S112). That is, the first correction value is a value that corrects the average of the luminance values in each of the blocks to the luminance at the second position, which is the first target value.

The first control section 150 controls the second projector 200B in accordance with the same procedure as that shown in FIG. 7 to calculate the second correction value that corrects the average of the luminance values in each of the blocks in the second projection area 13 to the luminance at the reference position. The information representing the range of the second projection area 13 identified by causing the second projector 200B to display the second pattern image, capturing an image of the second pattern image, and analyzing the captured image is called second range information.

Figure 8:
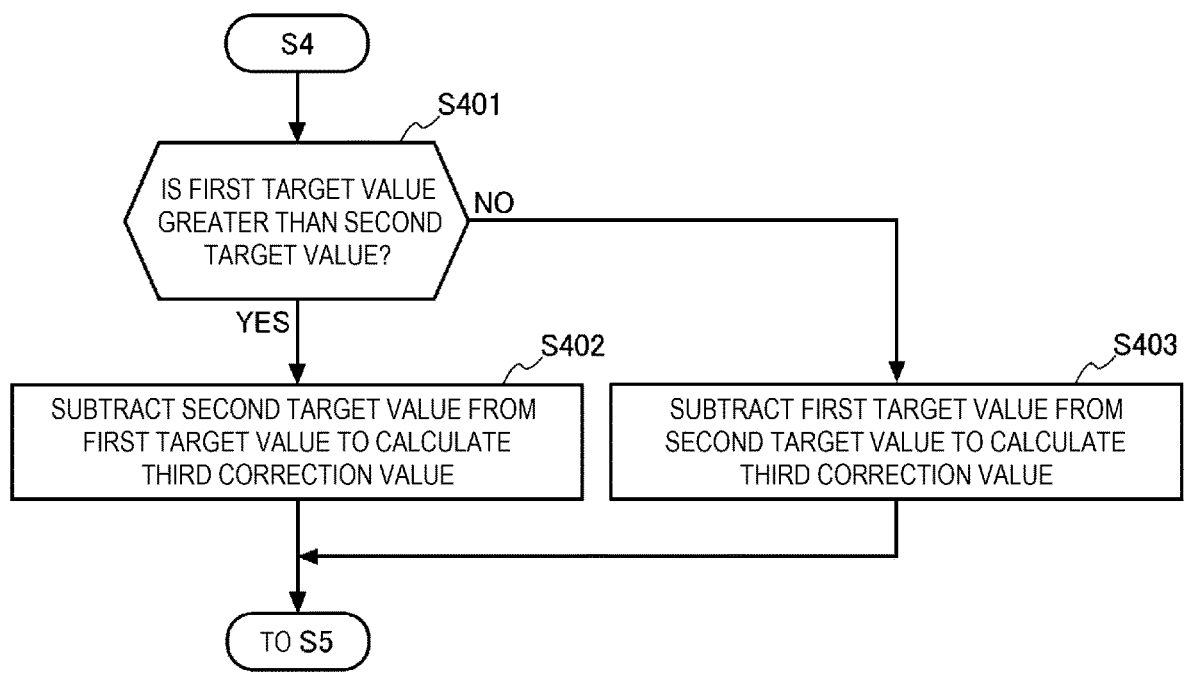
FIG. 8 is a flowchart showing the action of the display system.

FIG. 8 is a flowchart showing the action of the display system 1 and shows a detailed procedure of step S4. The detailed procedure of step S4 will be described with reference to the flowchart shown in FIG. 8.

The first control section 150 first compares the luminance value at the second position, which is the first target value, in the image displayed by the first projector 200A on the projection surface 10, with the luminance value at the fourth position, which is the second target value, in the image displayed by the second projector 200B on the projection surface 10 (step S401).

When the luminance value at the second position is greater than the luminance value at the fourth position (YES in step S401), the first control section 150 calculates the third correction values by subtracting the luminance value at the fourth position, which is the second target value, from the luminance value at the second position, which is the first target value (step S402). The first control section 150 then transmits the calculated third correction values to the first projector 200A in step S5.

When the luminance value at the fourth position is greater than the luminance value at the second position (NO in step S401), the first control section 150 calculates the third correction values by subtracting the luminance value at the second position, which is the first target value, from the luminance value at the fourth position, which is the second target value (step S403). The first control section 150 then transmits the third correction values calculated in step S403 to the second projector 200B in step S5.

Figure 9:
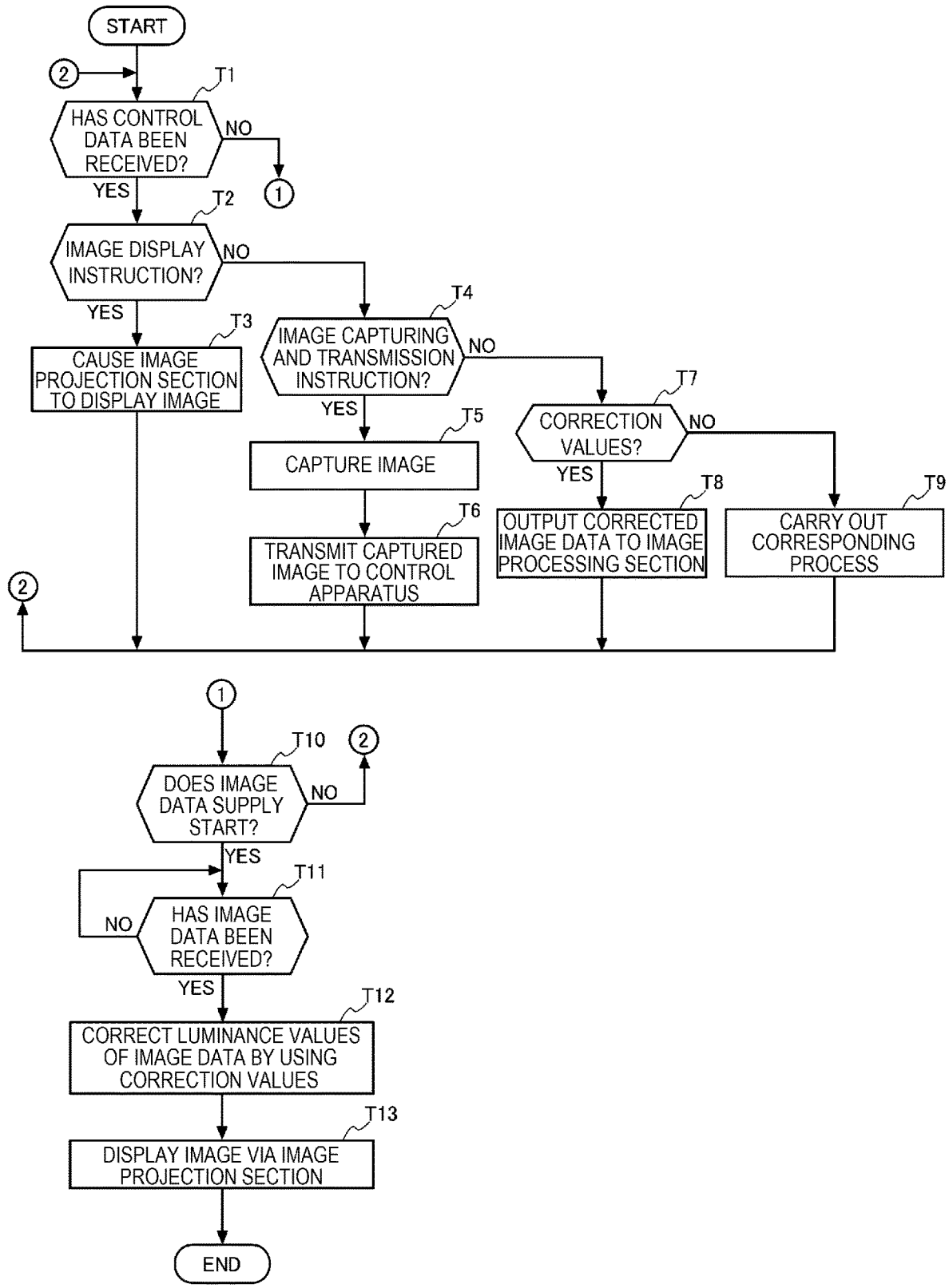
FIG. 9 is a flowchart showing the action of the first projector.

FIG. 9 is a flowchart showing the action of the first projector 200A.

The action of the first projector 200A will be described with reference to the flowchart shown in FIG. 9. The first projector 200A and the second projector 200B operate identically, and the action of the second projector 200B will not therefore be described in detail.

The second control section 250A first evaluates whether or not the second control section 250A have received control data from the control apparatus 100 (step T1). The control data includes, for example, the image display instruction, the image capturing and captured image transmission instruction, and the correction values generated by the control apparatus 100.

Having received no control data (NO in step T1), the second control section 250A transitions to evaluation in step T10. Having received control data (YES in step T1), the second control section 250A evaluates whether or not the received control data is the image display instruction (step T2). When the control data is the image data display instruction (YES in step T2), the second control section 250A causes the image projection section 230A to display image data instructed by the control data in the first projection area 11 (step T3).

When the received control data is not the image display instruction (NO in step T2), the second control section 250A evaluates whether or not the received control data is the image capturing and captured image transmission instruction (step T4). When the received control data is the image capturing and captured image transmission instruction (YES in step T4), the second control section 250A causes the imaging section 215A to capture an image (step T5). The second control section 250A then transmits the generated captured image to the control apparatus 100 (step T6).

When the received control data is not the image capturing and captured image transmission instruction (NO in step T4), the second control section 250A evaluates whether or not the received control data is the correction values that correct the luminance values of the image (step T7). The correction values that the first projector 200A receives from the control apparatus 100 include the first or third correction values. When the received control data is the correction values (YES in step T7), the second control section 250A outputs the received correction values to the image processing section 223A. When the image data received by the second I/F 221A is inputted, the image processing section 223A corrects the luminance values of the inputted image data by using the first or third correction values and outputs the corrected image data to the image projection section 230A (step T8).

When the received control data is not the correction values (NO in step T7), the second control section 250A carries out a process corresponding to the received control data (step T9). The process to be carried out at this point corresponds, for example, to the processes in steps S8 and S9 shown in FIG. 6. Having received the first setting information from the control apparatus 100, the second control section 250A lowers the luminance over the range of the image corresponding to the received first setting information by the preset setting value in accordance with the instruction from the control apparatus 100.

Having received no control data in step T1 (NO in step T1), the second control section 250A evaluates whether or not the second control section 250A has received an image data supply start notification from the control apparatus 100 (step T10). Having received no start notification (NO in step T10), the second control section 250A returns to the evaluation in step T1.

Having received the start notification (YES in step T10), the second control section 250A evaluates whether or not the second control section 250A has received image data from the control apparatus 100 (step T11). Having received no image data (NO in step T11), the second control section 250A waits for reception of image data. Having received image data (YES in step T11), the second control section 250A causes the image processing section 223A to correct the luminance values of the received image data.

The image processing section 223A corrects the luminance values of the image data received via the second I/F 221A by using the first or third correction values (step T12) and outputs the corrected image data to the image projection section 230A. The image projection section 230A displays an image based on the inputted image data in the first projection area 11 of the projection surface 10 (step T13).

6. Effects

As described above, the display system 1 according to the present embodiment includes the control apparatus 100, the first projector 200A, and the second projector 200B.

The control apparatus 100 carries out the processes below.

The control apparatus 100 first determines the first target value by correcting the first luminance value representing the luminance at the first position in the first image displayed by the first projector 200A on the projection surface 10 based on the second luminance value representing the luminance at the second position in the first image.

The control apparatus 100 then causes the first projector 200A to display on the projection surface 10 the first corrected image generated by correcting the first image in such a way that the luminance at the first position in the first image becomes the first target value.

The control apparatus 100 then determines the second target value by correcting the third luminance value representing the luminance at the third position in the second image displayed by the second projector 200B on the projection surface 10 based on the fourth luminance value representing the luminance at the fourth position in the second image.

The control apparatus 100 then causes the second projector 200B to display on the projection surface 10 the second corrected image generated by correcting the second image in such a way that the luminance at the third position in the second image becomes the second target value.

Thereafter, when the first target value is greater than the second target value, the control apparatus 100 changes the first target value based on the second target value and causes the first projector 200A to display on the projection surface 10 the third corrected image generated by using the changed first target value.

Thereafter, when the second target value is greater than the first target value, the control apparatus 100 changes the second target value based on the first target value and causes the second projector 200B to display on the projection surface 10 the fourth corrected image generated by using the changed second target value.

Therefore, a luminance value of the first image is corrected to the first target value, and a luminance value of the second image is corrected to the second target value. When the first target value is greater than the second target value, the third corrected image in which the first target value is corrected based on the second target value and the second corrected image having a luminance value equal to the second target value are displayed on the projection surface 10. Furthermore, when the second target value is greater than the first target value, the fourth corrected image in which the second target value is corrected based on the first target value and the first corrected image having a luminance value equal to the first target value are displayed on the projection surface 10. Luminance unevenness of images displayed by a plurality of projectors 200 can thus be corrected, whereby the luminance of the entire image displayed on the projection surface 10 can be uniform.

In the two-dimensional coordinate system employed by the control apparatus 100 and defined by the axis X parallel to a first side of the first image and the axis Y intersecting with the first side and parallel to a second side of the first image, the coordinate X of the second position is the integer ax that satisfies at least one of $0 \leq ax \leq 0.1X$ max or $0.9X$ max $\leq ax \leq X$ max where Xmax represents the maximum coordinate of the first image along the axis X.

Since an image displayed on the projection surface 10 is brighter at a position closer to the center of the image and becomes darker toward the periphery thereof, the first luminance value at the first position can be corrected based on the second luminance value at the second position by selecting a position that satisfies the conditions described above as the second position.

In the two-dimensional coordinate system employed by the control apparatus 100 and defined by the axis X parallel to the first side of the first image and the axis Y intersecting with the first side and parallel to the second side of the first image, the coordinate Y of the second position is the integer by that satisfies at least one of $0 \leq by \leq 0.1Y$ max or $0.9Y$ max $\leq by \leq Y$ max where Ymax represents the maximum coordinate of the first image along the axis Y.

Since an image displayed on the projection surface 10 is brighter at a position closer to the center of the image and becomes darker toward the periphery thereof, the first luminance value at the first position can be corrected based on the second luminance value at the second position by selecting a position that satisfies the conditions described above as the second position.

The control apparatus 100 selects the second position in the first image in such a way that the second position is located outward from the first position.

Since an image displayed on the projection surface 10 is brighter at a position closer to the center of the image and becomes darker toward the periphery thereof, the first luminance value at the first position can be corrected based on the second luminance value at the second position by selecting a position that satisfies the conditions described above as the second position.

In the two-dimensional coordinate system employed by the control apparatus 100 and defined by the axis X parallel to the first side of the first image and the axis Y intersecting with the first side and parallel to the second side of the first image, ax, by, cx, and dy are integers that satisfy the following conditions:

$$\left| cx - \frac{X\max}{2} \right| \leq \left| ax - \frac{X\max}{2} \right| \text{ and } \left| dy - \frac{Y\max}{2} \right| \leq \left| by - \frac{Y\max}{2} \right|$$

where Xmax represents the maximum coordinate of the first image along the axis X, Ymax represents the maximum coordinate of the first image along the axis Y, (cx, dy) represents the coordinates of the first position, and (ax, by) represents the coordinates of the second position.

Since an image displayed on the projection surface 10 is brighter at a position closer to the center of the image and becomes darker toward the periphery thereof, the first luminance value at the first position can be corrected based on the second luminance value at the second position by selecting a position that satisfies the conditions described above as the second position.

In the two-dimensional coordinate system employed by the control apparatus 100 and defined by the axis X parallel to the first side of the first image and the axis Y intersecting with the first side and parallel to the second side of the first image, one of (0, 0), (0, Ymax), (Xmax, 0), or (Xmax, Ymax) is selected as the coordinates of the second position (ax, by), where Xmax represents the maximum coordinate of the first image along the axis X, Ymax represents the maximum coordinate of the first image along the axis Y.

A pixel at an end of the first image can therefore be selected as the second position. Since an image displayed on the projection surface 10 is brighter at a position closer to the center of the image and becomes darker toward the periphery thereof, the first luminance value at the first position can be corrected based on the second luminance value at the second position by selecting a position that satisfies the condition described above as the second position.

The control apparatus 100 selects a pixel located substantially at the center of the first image as the first position.

The luminance value of the central pixel having high luminance can therefore be corrected to the luminance value of a peripheral pixel having low luminance.

In the two-dimensional coordinate system employed by the control apparatus 100 and defined by the axis X parallel to the first side of the first image and the axis Y intersecting with the first side and parallel to the second side of the first image, cx=Xmax/2 is selected as the coordinate cx of the first position along the axis X, and dy=Ymax/2 is selected as the coordinate dy of the first position along the Y-axis, where Xmax represents the maximum coordinate of the first image along the axis X, Ymax represents the maximum coordinate of the first image along the axis Y.

The luminance value of the central pixel having high luminance can therefore be corrected to the luminance value of a peripheral pixel having low luminance.

7. Other Embodiments

The embodiment described above is a preferable embodiment of the present disclosure. The present disclosure is, however, not limited to the embodiment described above, and a variety of variations are conceivable to the extent that the variations do not depart from the substance of the present disclosure.

For example, the first projector 200A or the second projector 200B may perform the actions of the control apparatus 100 according to the embodiment described above to generate the first, second, and third correction values.

The first projector 200A may generate the first correction values, and the second projector 200B may generate the second correction values. Furthermore, when the first target value is greater than the second target value, the first projector 200A may generate the third correction value, and when the second target value is greater than the first target value, the second projector 200B may generate the third correction value.

When the first projector 200A generates the first and third correction values, the first projector 200A performs the actions below.

The first projector 200A first determines the first target value by correcting the first luminance value representing the luminance at the first position in the first image, which is displayed by the first projector 200A on the projection surface 10, based on the second luminance value representing the luminance at the second position in the first image.

The first projector 200A then displays on the projection surface 10 the first corrected image generated by correcting the first image in such a way that the luminance at the first position in the first image becomes the first target value.

The first projector 200A then changes the first target value based on the second target value when the second target value, which is determined by correcting the third luminance value representing the luminance at the third position in the second image, which is displayed by the second projector 200B on the projection surface 10, based on the fourth luminance value representing the luminance at the fourth position in the second image, is smaller than the first target value.

The first projector 200A displays the third corrected image generated by using the changed first target value on the projection surface 10.

Also in the configuration described above, when the luminance values of the first image are corrected to the first target value, and the first target value is greater than the second target value, the third corrected image in which the first target value is corrected based on the second target value is displayed on the projection surface 10. The luminance unevenness of the images displayed by a plurality of projectors 200 can therefore be corrected by causing the second projector 200B to display on the projection surface 10 the second corrected image in which the luminance values have been corrected to the second target value, whereby the luminance of the entire image displayed on the projection surface 10 can be uniform.

In the embodiments described above, the luminance of the image displayed on the projection surface 10 is detected based on the image captured by the imaging section 215A incorporated in the first projector 200A, and the luminance may instead be detected with a sensor. The sensor is disposed, for example, between the light source 231A and the liquid crystal panels 233A and downstream from the rear end of any of mirrors that separate the light outputted from the light source 231A into the R light, the G light, and the B light.

The luminance values of the images displayed by the projectors 200 may be corrected after the luminance values in the blended area for the tiling projection are set. In this case, the control apparatus 100 sets a pixel at an end of the blended area to be the second position, the pixel set when the luminance values in the blended area are set, and generates the first correction value that corrects the luminance value at the first position to the luminance value at the set second position.

The control apparatus 100 may set the position shifted inward from an end of the image displayed in the first projection area 11 by 10% of the entire horizontal width thereof to be the second position, as described in the aforementioned embodiments.

In the embodiments described above, the image processing section 223A corrects the image data based on the first correction values or the first and third correction values to lower the luminance of the image. Another method for lowering the luminance of the image may be lowering the luminance value of the light from the light source 231A. In this case, the second control section 250A controls a light source driver that drives the light source 231A based on the first correction values or the first and third correction values received from the control apparatus 100 to lower the luminance value of the light from the light source 231A. The light source driver is not shown in the figures.

The functional portions of the control apparatus 100 shown in FIG. 2 each represent a functional configuration and are each not necessarily implemented in a specific form. That is, hardware corresponding to each of the functional portions is not necessarily implemented, and a single processor that executes a program can, of course, achieve the functions of the plurality of functional portions. Furthermore, in the embodiments described above, part of the functions achieved by software may be achieved by hardware, or part of the functions achieved by hardware may be achieved by software. In addition, the specific detailed configuration of each of the other portions in the control apparatus 100 can be arbitrarily changed to the extent that the change does not depart from the substance of the present disclosure. The same holds true for the configurations of the first projector 200A and the second projector 200B.

The functional portions of the projectors 200 shown in FIG. 3 each represent a functional configuration and are each not necessarily implemented in a specific form. That is, hardware corresponding to each of the functional portions is not necessarily implemented, and a single processor that executes a program can, of course, achieve the functions of the plurality of functional portions. Furthermore, in the embodiments described above, part of the functions achieved by software may be achieved by hardware, or part of the functions achieved by hardware may be achieved by software. In addition, the specific detailed configuration of each of the other portions of the projectors 200 can be arbitrarily changed to the extent that the change does not depart from the substance of the present disclosure.

The process units in the flowcharts shown in FIGS. 6 to 9 are process units into which the action of the display system 1 is divided in accordance with the contents of primary processes for easy understanding of the action. How to divide the action into the process units or the names of the process units shown in the flowcharts in FIGS. 6 to 9 do not limit the present disclosure. The processes carried out by the display system 1 can each be further divided into a larger number of process units, or can each be so divided that one process unit includes a larger number of processes in accordance with the content of the process. Furthermore, the orders in accordance with which the processes are carried out in the flowcharts described above are not limited to those shown in FIGS. 6 to 9.

In a case where the display method for the display system or the display method for the display apparatus according to the embodiments of the present disclosure is achieved by a computer provided in the control apparatus 100 or a computer provided in any of the projectors 200, a program executed by the computer can be configured in the form of a recording medium. The program executed by the computer can instead be configured in the form of a transmission medium via which the program is transmitted. The recording medium can be a magnetic or optical recording medium or a semiconductor memory device. Specific examples of the recording medium may include a flexible disk, an HDD, a CD-ROM (compact disk read only memory), a DVD (digital versatile disc), a Blu-ray disc, a magneto-optical disk, a flash memory, and a portable or immobile recording medium such as a card-shaped recording medium. The recording medium described above may instead be a RAM, a ROM, an HDD, or any other nonvolatile storage device that is an internal storage device provided in a server apparatus. Blu-ray is a registered trademark.

The aforementioned embodiments have been described with reference to a configuration using the projectors 200 each as the display apparatus, but not necessarily in the present disclosure. For example, the display apparatus may be formed of a self-luminous display apparatus, for example, a monitor or a television, such as a liquid crystal display, an organic EL (electro-luminescence) display, a plasma display, a micro-LED (light emitting diode) display, a CRT (cathode ray tube) display, an SED (surface-conduction electron-emitter display).

When any of the display apparatuses described above is employed, the liquid crystal panel, the organic EL panel, the plasma display panel, the LED, or any other image forming portion corresponds to the display section.

The embodiments described above have been described with reference to the configuration in which the projectors 200, which are each the display apparatus, each include three transmissive liquid crystal panels, the liquid crystal panels 233A(r), 233A(g), and 233A(b) corresponding to RGB, as the light modulators, but not necessarily. For example, the projectors 200 may each have a configuration employing three reflective liquid crystal panels or a single liquid crystal panel combined with a color wheel. The projectors 200 may still instead each have a configuration employing, for example, three digital mirror devices (DMDs) or a single digital mirror device combined with a color wheel. In place of a liquid crystal panel or a DMD, a light modulator capable of modulating the light outputted from a light source is employable with no problem.

What is claimed is:

1. A display method for a display system, the method comprising:
    determining a first target value by correcting a first luminance value representing luminance at a first position in a first image, which is displayed by a first display apparatus on a display surface, based on a second luminance value representing luminance at a second position in the first image;
    displaying, by the first display apparatus, on the display surface a first corrected image generated by correcting the first image in such a way that the luminance at the first position in the first image becomes the first target value;
    determining a second target value by correcting a third luminance value representing luminance at a third position in a second image, which is displayed by a second display apparatus on the display surface, based on a fourth luminance value representing luminance at a fourth position in the second image;
    displaying, by the second display apparatus, on the display surface a second corrected image generated by correcting the second image in such a way that the luminance at the third position in the second image becomes the second target value;
    displaying, by the first display apparatus, on the display surface a third corrected image generated by using a changed first target value obtained by changing the first target value based on the second target value when the first target value is greater than the second target value; and
    displaying, by the second display apparatus, on the display surface a fourth corrected image generated by using a changed second target value obtained by changing the second target value based on the first target value when the second target value is greater than the first target value.

2. The display method for a display system according to claim 1,
    wherein in a two-dimensional coordinate system defined by an axis X parallel to a first side of the first image and an axis Y parallel to a second side of the first image, the first side intersects with the second side,
    a coordinate X of the second position is an integer ax that satisfies at least one of $$0 \leq ax \leq 0.1 X \max \text{ or } 0.9 X \max \leq ax \leq X \max$$

where Xmax represents a maximum coordinate of the first image along the axis X.

3. The display method for a display system according to claim 1,
    wherein in a two-dimensional coordinate system defined by an axis X parallel to a first side of the first image and an axis Y parallel to a second side of the first image, the first side intersects with the second side, a coordinate Y of the second position is an integer by that satisfies at least one of $$0 \leq by \leq 0.1 Y \max \text{ or } 0.9 Y \max \leq by \leq Y \max$$

where Ymax represents a maximum coordinate of the first image along the axis Y.

4. The display method for a display system according to claim 1, wherein the second position is located outward from the first position in the first image.

5. The display method for a display system according to claim 1, wherein in a two-dimensional coordinate system defined by an axis X parallel to a first side of the first image and an axis Y parallel to a second side of the first image, the first side intersects with the second side, ax, by, cx, and dy are integers that satisfy $$\left| cx - \frac{X\max}{2} \right| \leq \left| ax - \frac{X\max}{2} \right| \text{ and } \left| dy - \frac{Y\max}{2} \right| \leq \left| by - \frac{Y\max}{2} \right|$$

where Xmax represents a maximum coordinate of the first image along the axis X, Ymax represents a maximum coordinate of the first image along the axis Y, (cx, dy) represents coordinates of the first position, and (ax, by) represents coordinates of the second position.

6. The display method for a display system according to claim 1,
wherein in a two-dimensional coordinate system defined by an axis X parallel to a first side of the first image and an axis Y parallel to a second side of the first image, the first side intersects with the second side, coordinates of the second position (ax, by) is one of (0, 0), (0, Ymax), (Xmax, 0), or (Xmax, Ymax), where Xmax represents a maximum coordinate of the first image along the axis X, and Ymax represents a maximum coordinate of the first image along the axis Y.

7. The display method for a display system according to claim 1, wherein the first position is located substantially at a center of the first image.

8. The display method for a display system according to claim 1,
wherein in a two-dimensional coordinate system defined by an axis X parallel to a first side of the first image and an axis Y parallel to a second side of the first image, the first side intersects with the second side,
a coordinate cx of the first position along the axis X is cx=Xmax/2, and
a coordinate dy of the first position along the axis Y is dy=Ymax/2,
where Xmax represents a maximum coordinate of the first image along the axis X, and Ymax represents a maximum coordinate of the first image along the axis Y.

9. A display method for a display apparatus, the method comprising:
determining a first target value by correcting a first luminance value representing luminance at a first position in a first image, which is displayed by a display apparatus on a display surface, based on a second luminance value representing luminance at a second position in the first image;
displaying, by the display apparatus, on the display surface a first corrected image generated by correcting the first image in such a way that a luminance at the first position in the first image becomes the first target value; and
displaying, by the display apparatus, on the display surface a third corrected image generated by using a changed first target value obtained by changing the first target value based on a second target value, which is determined by correcting a third luminance value representing luminance at a third position in a second image, which is displayed by another display apparatus different from the display apparatus on the display surface, based on a fourth luminance value representing luminance at a fourth position in the second image, when the second target value is smaller than the first target value.

10. A display system comprising:
a first display apparatus that displays a first image on a display surface;
a second display apparatus that displays a second image on the display surface; and
a control apparatus that
controls the first display apparatus and the second display apparatus,
determines a first target value by correcting a first luminance value representing luminance at a first position in the first image based on a second luminance value representing luminance at a second position in the first image,
causes the first display apparatus to display on the display surface a first corrected image generated by correcting the first image in such a way that the luminance at the first position in the first image becomes the first target value,
determines a second target value by correcting a third luminance value representing luminance at a third position in the second image based on a fourth luminance value representing luminance at a fourth position in the second image,
causes the second display apparatus to display on the display surface a second corrected image generated by correcting the second image in such a way that the luminance at the third position in the second image becomes the second target value,
causes the first display apparatus to display on the display surface a third corrected image generated by using a changed first target value obtained by changing the first target value based on the second target value when the first target value is greater than the second target value, and
causes the second display apparatus to display on the display surface a fourth corrected image generated by using a changed second target value obtained by changing the second target value based on the first target value when the second target value is greater than the first target value.

* * * * *